United States Patent [19]

Jacklin

[11] 4,391,157
[45] Jul. 5, 1983

[54] BEVEL GEAR AND PINION DRIVE WITH BIASED THRUST BEARING

[75] Inventor: Roger L. Jacklin, Waterloo, Iowa
[73] Assignee: Deere & Company, Moline, Ill.
[21] Appl. No.: 198,076
[22] Filed: Oct. 17, 1980
[51] Int. Cl.³ .................. F16H 35/08; F16H 1/14
[52] U.S. Cl. .................. 74/402; 74/410; 74/424
[58] Field of Search .......... 74/713, 423, 424, 417, 74/410, 396, 395, 400, 402; 308/174, 231, 234

[56] References Cited

U.S. PATENT DOCUMENTS

| | | | |
|---|---|---|---|
| 2,037,206 | 4/1936 | Boden | 74/424 |
| 2,693,244 | 11/1954 | Rockwell et al. | 74/424 |
| 2,906,360 | 9/1959 | Daley, Jr. | 74/424 |
| 3,416,848 | 12/1968 | Recknagel | 308/174 |
| 3,943,780 | 3/1976 | Klaue | 74/410 |
| 4,109,977 | 8/1978 | Stephan | 308/174 |
| 4,166,659 | 9/1979 | Gleichman | 308/231 |
| 4,233,855 | 11/1980 | Olschewski | 74/424 |
| 4,283,963 | 8/1981 | Hickey et al. | 74/713 |

FOREIGN PATENT DOCUMENTS 663586  5/1963  Canada .................. 308/234

*Primary Examiner*—Lawrence J. Staab
*Assistant Examiner*—Andrew Joseph Rudy
*Attorney, Agent, or Firm*—Henderson & Sturm

[57] ABSTRACT

A spiral bevel pinion and its meshing bevel gear are carried in a typical housing. The problem solved is accommodation of the axial thrust imparted to the pinion shaft during functioning of the drive train, the solution being in the form of biasing means backing up the thrust bearing ahead of the pinion and enabling the use of lighter-weight, less expensive bearings. A further feature is the use of a further bearing in the form of a needle bearing having radial needles between the inner race ring of the main thrust bearing and the biasing means.

3 Claims, 1 Drawing Figure

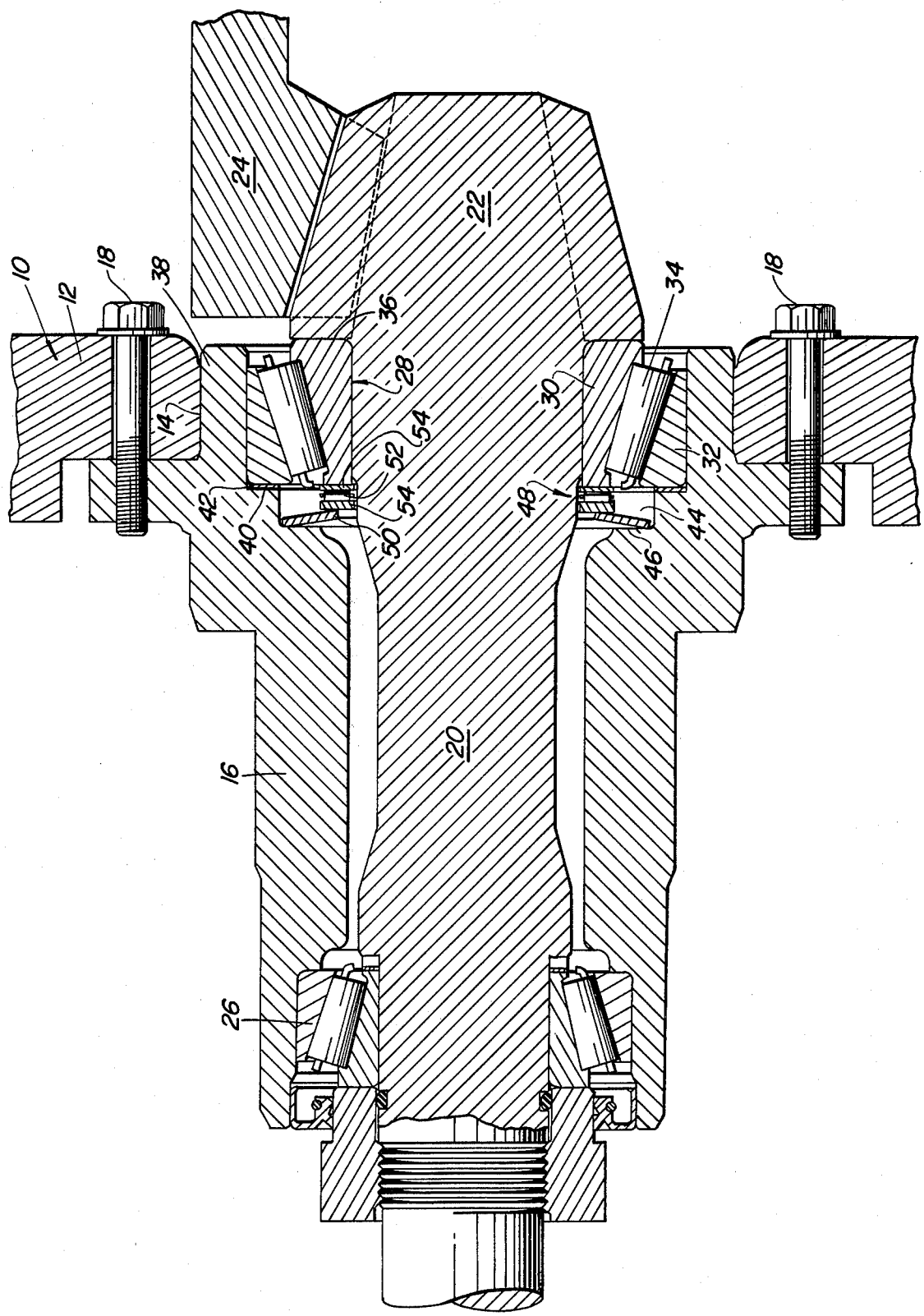

BEVEL GEAR AND PINION DRIVE WITH BIASED THRUST BEARING

BACKGROUND OF THE INVENTION

It is characteristic of bevel pinion and bevel gear drives that axial thrust forces are imparted to the pinion shaft during driving of the vehicle in which the drive train is incorporated. Thus, in a typical installation, such as in a farm or industrial vehicle, the pinion shaft extends for-and-aft and the pinion is fixed to the rear end of this shaft and meshes with a bevel gear journaled in the housing on a transverse horizontal axis. If the final drive is for the rear drive axles of the vehicle, the axial thrust forces on the pinion shaft will be forwardly. The prior solution to compensating for or accommodating the forward thrust has involved the use of heavier, stronger and thus more expensive design and materials, it being customary to utilize a so-called combination radial-thrust bearing, usually of the tapered roller bearing type.

According to the present invention, resort is had to lower-cost design because of the use of biasing means interposed between an annular shoulder in the housing and the inner race ring of the bearing. Preferably this means is of the coned-washer type, often referred to as a "Belleville" spring. This spring resists in a yielding fashion the forward thrust load on the main bearing. A low-friction bearing is interposed between the spring and the inner race ring and this bearing is preferably of the needle type, having its needles disposed radially.

DESCRIPTION OF THE DRAWING

The single sheet of drawings is a fragmentary section through a typical drive and housing assembly, the section being taken in a horizontal plane.

DESCRIPTION OF THE PREFERRED EMBODIMENT

For the purposes of simplicity and clarity, the elements of the construction will be referred to as being oriented geographically to the extent that the left-hand edge of the sheet is toward the front of the vehicle. Like expressions will appear in the claims, but it is to be understood that the invention is equally applicable to otherwise-arranged components.

A basic housing is shown at 10 having a transverse wall 12 provided with a circular opening 14 within which is received the rear end of a supporting quill 16. This is typically fixed to the housing wall by a circle of cap screws, one of which appears at 18. A pinion shaft 20 extends coaxially fore-and-aft through the quill and has a spiral bevel pinion 22 fixed to its rear end, which pinion meshes conventionally with a level gear 24. The pinion shaft is journaled in the quill by fore-and-aft spaced apart bearings 26 and 28, which to that extent is conventional, as is the journaling of the bevel gear. It is deemed that the latter is well enough known to forego detailed description.

The bearing 28 may be a conventional radial-thrust bearing of the tapered roller bearing type and has an inner race ring 30, an outer race ring 32 and a plurality of tapered rolling elements 34 between them. The junction of the pinion shaft and its pinion establishes a shoulder 36 which abuts forwardly against the inner race ring. The quill 16, in the area of the bearing 28, is formed as a collar 38 which has an interior radial shoulder 40 for receiving the front of the outer race ring. In a preferred construction, a shim pack 42 is interposed between the race ring and the shoulder. The thickness of this pack is determined at the time of installation. The collar portion has an interior annulus 44 provided with a second radical shoulder 46. In the present design, the shoulder 46 is spaced ahead of the inner race ring 30 and in this annular space is located the improved biasing means generally denoted 48. According to the preferred embodiment here, the biasing means comprises a spring 50 and a low-friction bearing means 52. The spring selected is of the coned-washer type, often referred to as a "Belleville" spring, and the bearing 52 is of the needle type having its needles disposed radially and typically rolling between two radical rings 54. The rear ring abuts the front of the inner race ring 30 and the front ring abuts or is abutted by the annular spring 50, the spring being biased between this front ring and the rear face of the annular shoulder 46, thus exerting a rearward force against the bearing 28 in opposition to the forward thrust force resulting from driving mesh of the level pinion and gear. As previously stated, this design enables the use of a much less costly radial thrust bearing, the savings more than paying for the spring 50 and the needle bearing 52.

Many modifications in the preferred embodiment will occur to those versed in the art, all without departure from the spirit and scope of the invention.

What is claimed is:

1. Drive mechanism including a fore-and-aft shaft having a spiral bevel pinion fixed at its rear end, a spiral bevel gear meshing with the pinion, a combination radial-thrust bearing including an inner race ring fitting the shaft so as to receive forward thrust forces imparted thereto by the meshing pinion and gear, an outer race ring and rolling elements between the rings, and fixed support structure carrying the bearing, characterized in that the support structure has a stepped annular groove therein concentrically surrounding the shaft ahead of the bearing and including a first radial shoulder facing toward and axially abutting the outer race ring and a second radical shoulder of lesser diameter than the first shoulder and spaced ahead of and facing the inner race ring and biasing means is disposed in the groove and is interposed between the second shoulder and the inner race ring in opposition to the aforesaid thrust forces.

2. The drive mechanism of claim 1, further characterized in that further bearing means is interposed between said spring and the inner race raing.

3. The drive mechanism of claim 2, further characterized in that further bearing means includes a plurality of radial needle bearings.

* * * * *

UNITED STATES PATENT AND TRADEMARK OFFICE
CERTIFICATE OF CORRECTION

PATENT NO. : 4391157
DATED : July 5, 1983
INVENTOR(S) : Roger Layton Jacklin

It is certified that error appears in the above-identified patent and that said Letters Patent are hereby corrected as shown below:

In column 1, at line 56, "level" should be --bevel--.
In column 2, at line 50, "radical" should be --radial--.

Signed and Sealed this

Twentieth Day of September 1983

[SEAL]

Attest:

GERALD J. MOSSINGHOFF

Attesting Officer

Commissioner of Patents and Trademarks